United States Patent

Nakajima

[11] Patent Number: 5,915,946
[45] Date of Patent: *Jun. 29, 1999

[54] SPLIT RING FOR FISHING

[76] Inventor: Tetsuro Nakajima, 126-165, Toyoda-cho, Kashihara-shi, Nara-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/950,935

[22] Filed: Oct. 15, 1997

[30] Foreign Application Priority Data

Feb. 10, 1997 [JP] Japan ................................ 9-041657
May 20, 1997 [JP] Japan ................................ 9-145733

[51] Int. Cl.⁶ .................................................. A01K 91/04
[52] U.S. Cl. .......................... 43/44.86; 24/908; D3/207; 70/458
[58] Field of Search ................................ 43/44.83, 42.49, 43/44.86; 24/908; D3/207; 70/456 R, 457, 458, 459

[56] References Cited

U.S. PATENT DOCUMENTS

| | | | |
|---|---|---|---|
| 872,934 | 12/1907 | Harig | 24/908 |
| 1,191,009 | 7/1916 | Laramie | 24/908 |
| 1,924,165 | 8/1933 | Reekers | 24/908 |
| 2,768,468 | 10/1956 | Kibler | 43/44.83 |
| 2,871,540 | 2/1959 | Smith | 43/44.83 |
| 3,041,772 | 7/1962 | Laszlo | 43/42.49 |
| 3,122,803 | 3/1964 | Boggess | 24/908 |
| 3,241,201 | 3/1966 | Chester | 43/44.83 |
| 4,924,618 | 5/1990 | McGahee | 43/43.6 |

FOREIGN PATENT DOCUMENTS

| | | |
|---|---|---|
| S58-122968 | 8/1983 | Japan . |
| S34-19304 | 11/1984 | Japan . |
| H8-277829 | 10/1996 | Japan . |

*Primary Examiner*—Jack W. Lavinder
*Attorney, Agent, or Firm*—Koda & Androlia

[57] ABSTRACT

The present invention discloses a split ring for fishing having two ring portions arranged vertically and made by bending a hard wire having appropriate elasticity into the form of a figure eight, wherein both ends of the wire are overlapped with each other in close or almost close contact with each other so as to form a part of one of the ring portions. With the above-mentioned structure, the lure and the hook are not entangled with each other. In addition, the lure and the hook can have larger freedom of movement, and this is likely to bring a bigger fish catch. Furthermore, the hook can be attached to and removed from the lure easily, and the lure can be connected to and removed from the fishing line easily.

2 Claims, 3 Drawing Sheets

SPLIT RING FOR FISHING

BACKGROUND OF THE INVENTION

1. Field of the Invention

The present invention relates to a split ring for attaching and connecting a lure for fishing to a hook and a fishing line.

2. Description of the Prior Art

FIG. 1 shows a conventional split ring. A split ring 3 has a ring portion 3a formed by simply bending a steel wire into a ring. The ends 4 and 5 of the steel wire constituting parts of the ring portion 3a are overlapped with each other in close or almost close contact with each other.

FIG. 2 shows a condition wherein a hook is attached to a lure. In order to attach a hook 2 to a lure 1, the space between the ends 4 and 5 must be widened, and one of the ends must be inserted into the internal areas of the ring 1a of the lure 1 and the ring 2a of the hook 2. In addition, while the space between the ends 4 and 5 is widened, the one end must be passed through the overlapped portions so that the rings 1a and 2a are moved to the ring portion 3a of the split ring 3. However, this work is unexpectedly troublesome, and finger tips are likely to be injured. Furthermore, in winter when the hands become benumbed, the work becomes more troublesome. Moreover, since both the rings 1a and 2a enter the internal area of the ring 3a, the lure 1 and the hook 2 are not positioned stably, and the rings 1a and 2a may be entangled with each other. As a result, the lure 1 and the hook 2 have smaller freedom of movement, thereby causing the problem of a poor fish catch.

Besides, a fishing line is directly tied to a ring 12 disposed at the other end of the lure 1. However, the lure 1 is required to be replaced with another lure depending on circumferences. This replacement work is also troublesome and takes time particularly in winter when the hands become benumbed. As describing above, the conventional split ring has problems to be solved.

SUMMARY OF THE INVENTION

Accordingly, a first object of the present invention is to provide a split ring allowing a hook to be attached to and removed from a lure easily, and also allowing the lure to be attached to and removed from a fishing line easily. A second object of the present invention is to provide a split ring allowing the attached lure and the attached hook to be positioned stably and not to be entangled with each other, and also allowing the lure and the hook to have larger freedom of movement so as to be likely to bring a bigger fish catch.

To achieve the above-mentioned objects, the split ring for fishing in accordance with the present invention has two ring portions arranged vertically and made by bending a hard wire, such as a metal or plastic wire, having appropriate elasticity into the form of a figure eight, wherein both ends of the wire being are overlapped with each other in close or almost close contact with each other so as to constitute parts of one of the ring portions.

In addition, one of both ends is bent toward the center of a ring portion having the end as a part of the ring portion.

Thanks to this structure of the split ring, when a hook is attached to a lure, the ring of the lure can be connected to one of the two ring portions of the split ring, and the ring of the hook can be connected to the other ring portion. Since the ring of the lure and ring of the hook do not overlap each other in a single ring portion, the lure and the hook are not entangled with each other.

Furthermore, in the case of the split ring having one of end bent toward the center of one of the ring portions, after the bent portion is inserted into the ring of a lure or the ring of a hook, by inserting the ring from the root portion of the bent portion into the space between the overlapped portions of both ends, and by passing the ring through the overlapped portions while widening the space, the ring can be inserted into the internal area of the ring portion of the split ring. Moreover, in this condition, by inserting the ring of the lure or the ring of the hook from the root portion of the bent portion into the space between the overlapped portions at both ends, and by passing the ring through the overlapped portions, the ring can be removed from the ring portion of the split ring. In this way, the lure and hook can be attached to and removed from the split ring easily.

Additionally, once a fishing line has been connected to one of the two ring portions of the split ring, a lure can be attached to the other ring portion. Therefore, the lure can be attached to and removed from the split ring easily.

DETAILED DESCRIPTION OF THE PREFERRED EMBODIMENTS

Figure 1A:
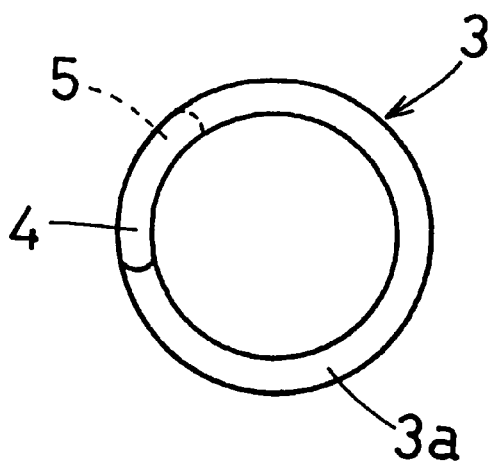
FIG. 1A is a front view showing a conventional split ring.
Figure 1B:
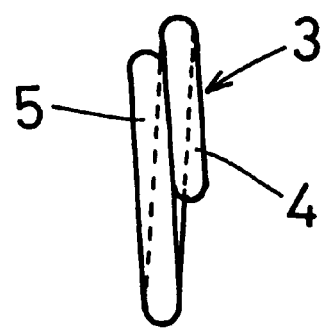
FIG. 1B is a side view showing the conventional split ring.
Figure 2:
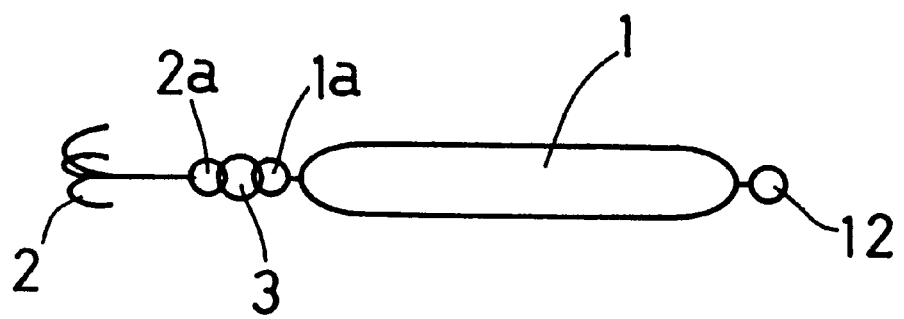
FIG. 2 is a view showing a condition wherein a hook is attached to a lure by using the conventional split ring.
Figure 3A:
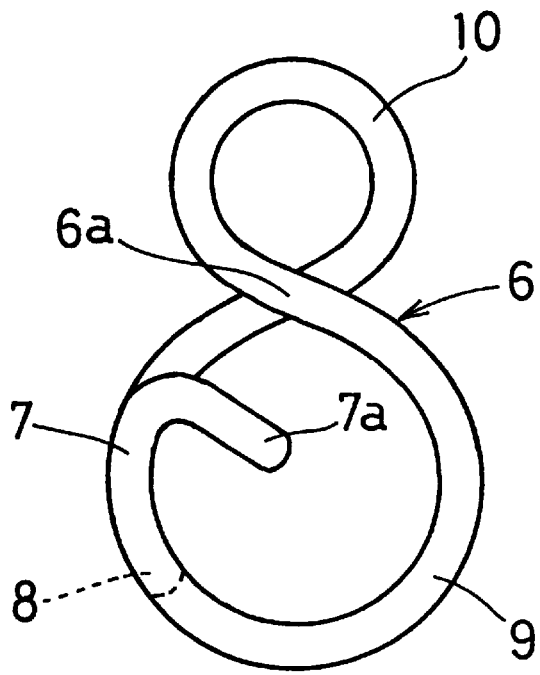
FIG. 3A is a front view showing a split ring in accordance with an embodiment of the present invention.
Figure 3B:
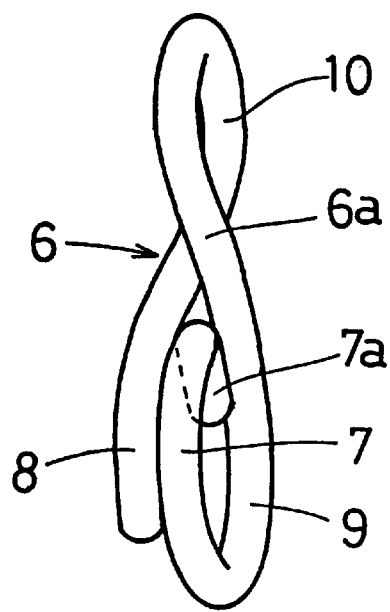
FIG. 3B is a side view showing the split ring shown in FIG. 3A.

Embodiments in accordance with the present invention are described below. Referring to FIGS. 3A and 3B, numeral 6 designates a split ring in accordance with the present invention. The split ring 6 is formed by bending a hard wire having appropriate elasticity into the shape of a figure eight so that two ring portions 9 and 10 are arranged vertically. The ends 7 and 8 of the wire are positioned at one of the ring portions 9 and 10, at the ring portion 9 in the case of the split ring shown in FIGS. 3A and 3B. Both ends are overlapped with each other in close or almost close contact with each other so that the ends constitute parts of the ring portion 9. One of the ends 7 and 8, the end 7 in the case of the split ring shown in FIGS. 3A and 3B, is bent toward the center of the ring portion 9 to form a bent portion 7a. The split ring 6 is made of a metal wire, such as a steel wire or a stainless steel wire, or a plastic wire, such as an ABS plastic wire.

Figure 4:
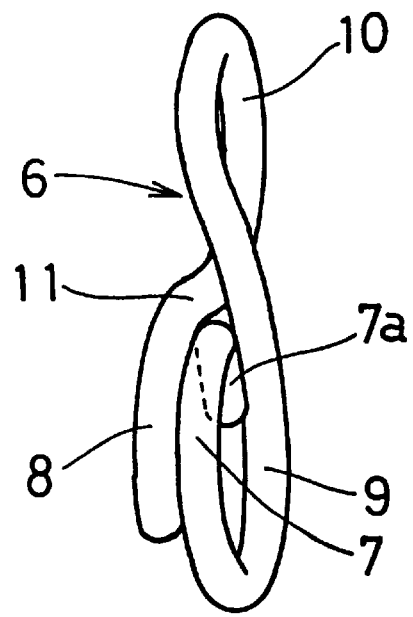
FIG. 4 is a side view showing a split ring in accordance with another embodiment of the present invention.

FIG. 4 shows an embodiment wherein the end 8 is provided with a curved portion 11. The curved portion 11 is formed in a shape curved along the portion corresponding to the root of the bent portion 7a. By providing this curved portion 11, the overlapped portions at the ends 7 and 8 can make close contact with each other more securely.

The steps for attaching a lure 1 and a hook 2 to the above-mentioned split ring 6 are described below.

Hold the lure 1 and the hook 2, regardless of their back-and-forth directions, with one hand, and hold the split ring 6 with the other hand. Insert the bent portion 7a of the split ring 6 into the internal area of the ring 1a of the lure 1 or the ring 2a of the hook 2. Pull the ring 1a or the ring 2a along the curve of the ring portion 9. As a result, the ring 1a or the ring 2a slides along the space between both ends 7 and 8 of the split ring 6 while widening the space, passes through the overlapped portions and enters the internal area of the ring 9. Then, slide the ring 1a or 2a further while widening the space between overlapped portions at the figure-8-shaped intersection 6a of the split ring 6 and insert the ring into the internal area of the upper ring portion 10. This completes the attachment of the lure 1 or the hook 2 to the split ring 6.

Figure 5:
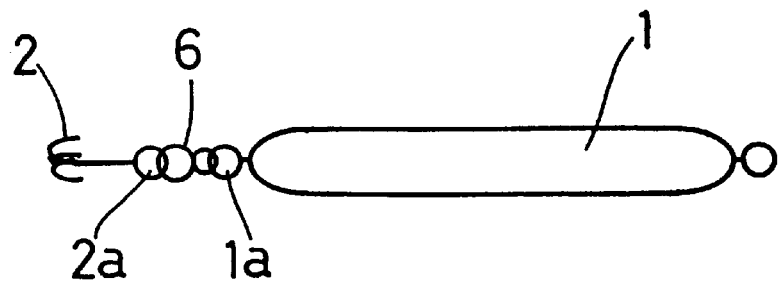
FIG. 5 is a view showing a condition wherein a hook is attached to a lure by using the split ring in accordance with the embodiment.

Next, insert the ring 1a of the lure 1 or the ring 2a of the hook 2, which has not yet been attached to the split ring 6 at the above-mentioned attachment steps, into the internal area of the lower ring portion 9 of the split ring 6 by sliding the ring from the tip of the bent portion 7a in the same way as described above. By following these steps, the lure 1 and the hook 2 are connected to each other via the split ring 6 (see FIG. 5).

The hook 2 is more likely to be damaged than the lure 1 during fishing, and is required to be replaced more frequently than the lure 1. Therefore, it is recommended that the hook 2 should be attached to the ring portion 9 after the lure 1 is attached to the ring portion 10 of the split ring 6, i.e., the ring portion on the side thereof wherein the ends 7 and 8 are not formed.

Figure 6:
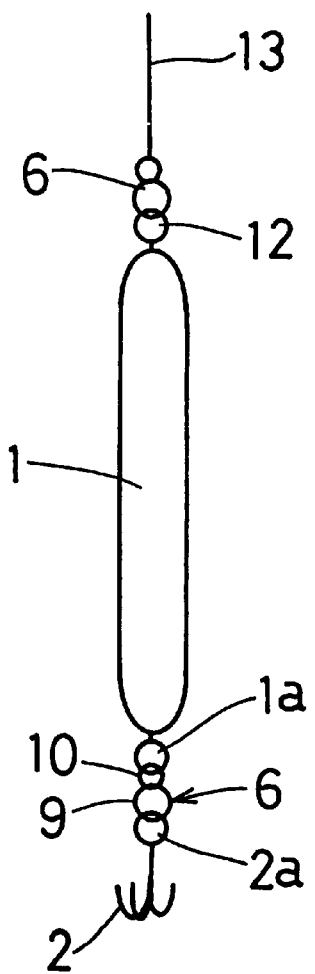
FIG. 6 is a view showing a condition wherein a hook and a fishing line are attached to a lure by using the split ring in accordance with the embodiment.

In order to attach the lure 1 to a fishing line 13, take the following steps. First, tie the tip of the fishing line 13 to the ring portion 10 of the split ring 6. Next, attach the ring 12 of the lure 1 on the side thereof not connected to the hook 2 to the ring portion 9 of the split ring 6 in a manner similar to the above-mentioned attachment steps for the hook 2 (see FIG. 6). When it is necessary to remove the lure 1 from the fishing line 13 in order to replace the lure 1 or because of other reasons, this can be done by simply removing the lure 1 from the split ring 6 by taking the attachment steps in reverse order.

Since the split ring of the present invention has a figure-8-shaped form having two ring portions arranged vertically, the ring of the lure and the ring of the hook can be attached to the upper and lower ring portions of the split ring separately. Therefore, since the ring of the lure and the ring of the hook, both attached to the split ring, do not overlap each other, the lure and the hook are not entangled with each other. In addition, the lure and the hook can have larger freedom of movement, and this is likely to bring a bigger fish catch.

Furthermore, in the case of the split ring having one end bent toward the center of one of the ring portions, by passing the bent portion through the ring of the lure or the ring of the hook, and by pulling the lure or the hook, the space between the overlapped portions at the ends is widened easily, and the ring of the lure or the ring of the hook can be inserted into the internal area of the split ring. Alternatively, by taking the above-mentioned steps in reverse order, the ring of the lure or the ring of the hook can be removed from the internal area of the split ring. Therefore, the lure and the hook can be attached to and removed from the split ring easily, and finger tips are not likely to be injured.

Moreover, when the end of the fishing line is attached to one of the two ring portions of the split ring, a lure can be connected to and removed from the other ring portion easily, whereby the lure can be replaced easily.

What is claimed is:

1. A split ring for fishing having two ring portions which comprise a larger diameter ring portion and a second diameter portion arranged vertically and made by bending a single continuous hard wire having appropriate elasticity into the form of a figure eight, wherein said two circular ring portions are located vertically with reference to an intersection of the two ring portions and both ends of said wire are overlapped with each other in close or almost close contact with each other so as to form a part of a side of said larger diameter ring portion, and one of both ends of said wire which faces said intersection is bent toward the center of said larger diameter ring portion in order to form a bent portion adjacent to said intersection, said intersection intersecting with a slight space in between.

2. A split ring for fishing according to claim 1, wherein said split ring is made of a metal wire, such as a steel wire or a stainless steel wire, or a plastic wire.

* * * * *